Sept. 13, 1960

A. FEXAS 2,952,173

OPTICAL TOOL

Filed July 2, 1959

INVENTOR.
ACHILLES FEXAS

BY
S.B. Schlessel
ATTORNEY

_United States Patent Office_

2,952,173
Patented Sept. 13, 1960

---

2,952,173

OPTICAL TOOL

Achilles Fexas, 10—26 Totten St., Queens,
Beechhurst, N.Y.

Filed July 2, 1959, Ser. No. 824,519

4 Claims. (Cl. 81—3.6)

This invention relates to the field of optical tools, and has for its objective the creation of a tool for use in the adjustment of eyeglass frames, particularly those of horn or shell material, by which the angle of the frame's temples can be inclined with respect to the front of the frame without weakening or breaking the temples from the hinge by which each is secured to the front of the frame.

In the field of optometry, and specifically the fitting of eyeglasses to an individual wearer, it is well known that the angle of the face and the position of the ears of human beings differ, and consequently it is necessary to adjust the temples of the selected eyeglass frame by bending them upward or downward from their original position with respect to the front of the frame, so that the temples will rest securely upon the ears of the wearer with the proper incline of the front, and the lenses, to the eyes of the wearer. With most of the frames in use at the present time, and particularly with horn or shell frames, the temples are secured to the front of the frame by means of strap hinges, with one strap riveted to the front and the other to the end of the temple adjacent to the front. Obviously, bending the temple from its fixed position by ordinary manual means tends to weaken the joint of the hinge strap with the temple, and causes the temple to become loose, and frequently to break off. The presently known use of two pairs of ordinary pliers, one to grip the front and the other to move the temple, produces equally unsatisfactory results of loosening and breakage, even with the most careful application. Attempts to incline the temples of a frame with respect to the front by the use of an ordinary pliers to hold the front and a thin-nosed pliers to grasp and turn the joint of the hinge has likewise proved difficult and unsatisfactory because of limitations on leverage space, as well as endangering the union of the hinge with the temple.

It is therefore the principal object of my invention to provide an optical tool, for cooperative use with an ordinary holding pliers, whereby the optical tool is adapted to engage both the temple of a frame and its hinge strap simultaneously, so that the temple and its hinge strap are moved as a single unit without damage to their union.

Another important object of my invention lies in the provision of an optical tool which can incline the temple of a frame with respect to its front to any desired degree in a single operation.

A third important object of my invention lies in the provision of an optical tool, for inclining the temples of a frame with respect to its front, which is inexpensive to manufacture and easy to use.

Other salient objects, advantages and functional features of my invention, together with the novel features of construction and arrangement of parts, will be more readily apparent from an examination of the following description, taken with the accompanying drawings, wherein.

Similar reference characters designate similar parts throughout the different views.

Figure 1:
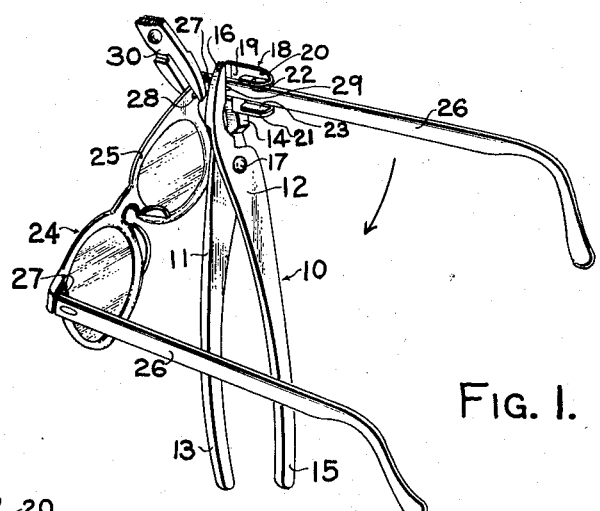
Fig. 1 is a perspective view of a preferred embodiment of my invention, showing it in position upon the temple of an eyeglass frame for inclining the temple.
Figure 2:
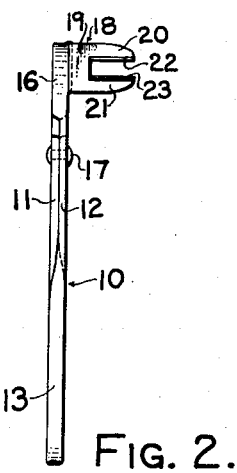
Fig. 2 is a side view of this embodiment of my invention.
Figure 4:
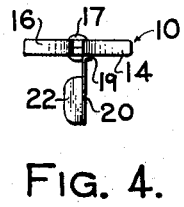
Fig. 4 is a top view of this embodiment, taken in the direction of the arrow shown on Fig. 3.
Figure 3:
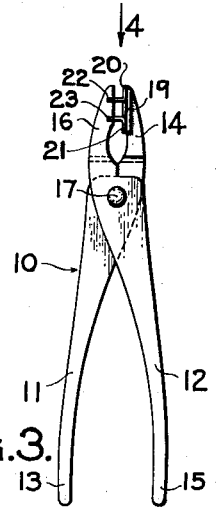
Fig. 3 is a front view of this embodiment.

Illustrative of the embodiment shown by Figs. 1–4, my optical tool 10 comprises a pair of co-acting members 11 and 12. Member 11 comprises a handle section 13 and an elongated jaw 14, while member 12 comprises a similar handle section 15 and a similar jaw 16, the members 11 and 12 being secured together by a bolt 17 to form a pair of pliers with parallel jaws 14 and 16, adapted to grip and hold an object thereinbetween when the handles 13 and 15 are brought together. The opposing faces of the jaws 14 and 16 are preferably, but not necessarily, serrated for better gripping and holding.

Integral with one side of the jaw 14, and extending longitudinally perpendicularly therefrom, there is provided a substantially U-shaped extension 18, comprising a base 19, which is integral with the jaw 14, and a pair of substantially parallel arms 20 and 21. The arms 20 and 21 are spaced apart from each other a distance greater than the width of the temple of any pair of eyeglass frames upon which the tool 10 is intended to be used, and the inner edges of the arms 20 and 21 are each provided with a respective flange 22 and 23 integral with and extending perpendicularly from the plane of the respective arms 20 and 21 in the direction of the jaw 16, so that the flanges 22 and 23 are substantially parallel to each other and extend beyond the face of the jaw 16 when the jaws 14 and 16 are brought together.

The position for operation of the optical tool 10 is illustrated in Fig. 1 of the drawings, where there is shown, in addition to the tool 10, a shell eyeglass frame 24 consisting of a front section 25 and temples 26. The temples 26 are secured to opposite ends of the front section 25 by means of strap hinges 27, one strap 28 of the hinge 27 being riveted to the front section 25 and the other strap 29 to the temple 26. There is also shown a fragmentary section of an ordinary pliers 30.

In operation of my optical tool 10 to bend or incline the temples 26 of the frame 24 with respect to the front section 25, the front section 25 is first gripped and held securely wih the ordinary pliers 30, so that its jaws are firmly secured to the front section 25 and the hinge strap 28. Assuming that it is necessary to bend the temple 26 in a downward direction, as indicated by the arrow, the optical tool 10 is inserted upon the temple 26 so that the flange 22 is in contact with the top edge of the temple 26 while the jaws 14 and 16 are positioned on either side of the hinge strap 29. The handles 13 and 15 are then squeezed together until the jaws 14 and 16 grip the hinge strap 29 firmly, and the tool 10 is turned in the direction shown by the arrow until the desired degree of change in the angle of the temple 26 with respect to the front section 25 is achieved. Similarly, where it is desired to bend the temple 26 upwards from its angle with the front section 25, the tool 10 is first positioned so that the flange 23 is in contact with the lower edge of the temple 26 while the jaws 14 and 16 are positioned on either side of the hinge strap 29. In this position the jaws 14 and 16 are tightened together and the tool 10 is moved in a direction opposite that shown by the arrow, to the desired degree of angle. In each of these operations the hinge strap 29 and the temple 26 are moved as an integral unit so that there is not any possibility of the temple 26 loosening from the hinge strap 29, or breaking off therefrom, as would occur if the temple 26 were moved alone.

Figure 7:
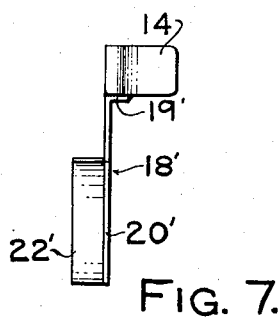
Fig. 7 is a top view thereof.
Figure 5:
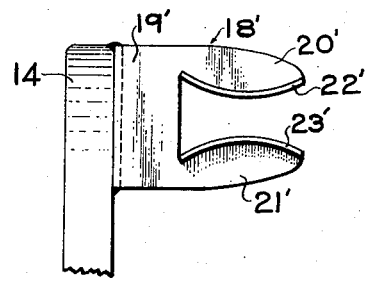
Fig. 5 is an enlarged, fragmentary, side view of a modified embodiment of my invention.
Figure 6:
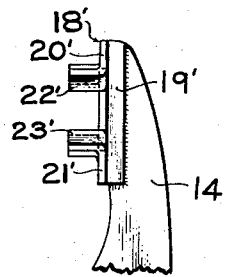
Fig. 6 is a front fragmentary view of the embodiment shown by Fig. 5.

A modified embodiment of my invention is shown in Figs. 5, 6 and 7, wherein the inner sides of the arms 20' and 21' are arcuate or rounded, as shown. The flanges 22' and 23', perpendicular to the plane of the arms 20' and 21', follow the shape of these inner sides of the arms 20' and 21'. This embodiment is to be preferred for use in such cases where additional leverage is required to bend the temples 26, since the point of contact of either the flange 22' or 23', as required, is further from the point of contact of the jaws 14 and 16. This embodiment is also more effective when a greater degree of bending of the temples 26 is necessary, and the tool in this embodiment need not be held perpendicular to the temple 26, but can be positioned at a different angle thereto as well.

As is apparent, various modifications may be made in the application and use of my invention within the scope of the disclosure. The embodiments above shown and described are by way of illustration and not limitation, and various changes may be made in the construction, composition and arrangement of parts without limitation upon or departure from the spirit and scope of the invention, or sacrificing any of the advantages thereof inherent therein, all of which are herein claimed.

Having described my invention, I claim:

1. An optical tool comprising in combination a pair of pliers provided with parallel jaws and a substantially U-shaped element integral with the side of one of the jaws and extending perpendicularly therefrom, the U-shaped element comprising a base and a pair of arms spaced apart from each other, each of the arms provided with a flange extending in the direction of the opposing jaw.

2. An optical tool comprising in combination a pair of pliers provided with parallel jaws and a substantially U-shaped element integral with the side of one of the jaws and extending perpendicularly therefrom, the U-shaped element comprising a base and a pair of arms spaced apart from each other, each of the arms provided with a flange along its inner side extending perpendicularly therefrom beyond the face of the jaw, in the direction of the opposing jaw.

3. An optical tool comprising in combination a pair of pliers provided with parallel jaws and a substantially U-shaped element integral with the side of one of the jaws and extending perpendicularly therefrom, the U-shaped element comprising a base and a pair of substantially parallel arms spaced apart from each other, each of the arms provided with a flange along its inner side extending perpendicularly therefrom beyond the face of the jaw, in the direction of the opposing jaw.

4. An optical tool comprising in combination a pair of pliers provided with parallel jaws and a substantially U-shaped element integral with the side of one of the jaws and extending perpendicularly therefrom, the U-shaped element comprising a base and a pair of arms spaced apart from each other and having arcuate inner edges, a flange provided along each of said arcuate edges extending perpendicularly from the plane of said arms, said flanges extending beyond the face of said plier jaw in the direction of the opposing jaw.

References Cited in the file of this patent

UNITED STATES PATENTS

| | | |
|---|---|---|
| 1,289,381 | Brumfield | Dec. 31, 1918 |
| 1,334,965 | Ridings | Mar. 30, 1920 |
| 1,354,365 | Aaron | Sept. 28, 1920 |
| 2,697,956 | Cook | Dec. 28, 1954 |